United States Patent [19]

Hakamada

[11] Patent Number: 4,761,688

[45] Date of Patent: Aug. 2, 1988

[54] TELEVISION RECEIVER

[75] Inventor: Kunio Hakamada, Tokyo, Japan

[73] Assignee: Sony Corporation, Tokyo, Japan

[21] Appl. No.: 97,099

[22] Filed: Sep. 15, 1987

[30] Foreign Application Priority Data

Sep. 20, 1986 [JP] Japan ................................ 61-223437

[51] Int. Cl.$^4$ ............................................ H04N 5/272
[52] U.S. Cl. ...................................... 358/183; 358/22
[58] Field of Search .......................... 358/183, 182, 22

[56] References Cited

U.S. PATENT DOCUMENTS

| | | | |
|---|---|---|---|
| 3,911,420 | 10/1975 | Lampson | 358/183 X |
| 3,943,280 | 3/1976 | Kimura et al. | |
| 4,070,695 | 1/1978 | Scholz et al. | |
| 4,139,860 | 2/1979 | Micic et al. | 358/183 X |
| 4,172,264 | 10/1979 | Taylor et al. | 358/183 X |
| 4,238,773 | 12/1980 | Tsuboka et al. | |
| 4,249,213 | 2/1981 | Imaide et al. | 358/183 |
| 4,266,242 | 5/1981 | McCoy | |
| 4,267,560 | 5/1981 | Ishikawa et al. | |
| 4,278,993 | 7/1981 | Suzuki | |
| 4,612,569 | 9/1986 | Ichinose | |
| 4,621,259 | 11/1986 | Schepers et al. | |
| 4,623,915 | 11/1986 | Bolger | 358/22 |
| 4,636,864 | 1/1987 | Annegarn et al. | |
| 4,665,438 | 5/1987 | Miron et al. | |
| 4,673,983 | 6/1987 | Sarugaku et al. | |
| 4,680,622 | 7/1987 | Barnes et al. | 358/183 X |
| 4,682,234 | 7/1987 | Naimpally | |
| 4,694,343 | 9/1987 | Flora | 358/183 |
| 4,694,344 | 9/1987 | Flora | 358/183 |
| 4,698,664 | 10/1987 | Nichols et al. | |

FOREIGN PATENT DOCUMENTS

| | | |
|---|---|---|
| 2822785 | 7/1978 | Fed. Rep. of Germany . |
| 54-34618 | 3/1979 | Japan . |
| 56-27573 | 3/1981 | Japan . |
| 60-180283 | 9/1985 | Japan . |
| 60-47792 | 10/1985 | Japan . |

OTHER PUBLICATIONS

"TV Receiver Puts Two Pictures on Screen at Same Time", by Manfred Ullrich, Electronics, Sep. 1, 1977.
"Fully Digitalized Color Picture in Picture Television System", by Michio Masuda, et al. 0098-3053/79/0400/0152S00.75 1979 IEEE.

Primary Examiner—James J. Groody
Assistant Examiner—E. Anne Faris
Attorney, Agent, or Firm—Philip M. Shaw, Jr.

[57] ABSTRACT

A picture-in-picture television receiver is so arranged that the compression ratio of a sub-picture discrimination character displayed on a sub-picture screen relative to a main picture discrimination character is selected to be smaller than that of the sub-picture relative to the main picture, whereby the sub-picture discrimination character is displayed relatively large in an easier-to-see form.

6 Claims, 4 Drawing Sheets

Sm

Ss  Sm

Ss  Sm

TELEVISION RECEIVER

BACKGROUND OF THE INVENTION

1. Field of the Invention

The present invention relates generally to a so-called picture-in-picture type television receiver in which a sub-picture screen is inset into a main picture screen in a picture-in-picture fashion.

2. Description of the Prior Art

There is known a so-called picture-in-picture type television receiver in which a sub-picture screen is provided within a main picture screen such that pictures having different contents can be displayed on the main and sub-picture screens, respectively. According to this prior art television receiver, the television channels of the main picture and the sub-picture or the number of an external video signal input terminal are displayed on a front panel of the television receiver using a display apparatus such as an LED (light emitting diode) and the like or these numbers are displayed on the picture screen of the cathode ray tube. When these numbers, which are referred to herein as discrimination characters, are displayed on the screen, they are displayed on the main picture screen together.

Further, the picture-in-picture type television receiver is provided with a main tuner for selecting the video signal for the main picture screen and a sub-tuner for selecting a video signal for the sub-picture screen. In such a prior art television receiver, it is preferable that the channel selection operations can be carried out independently in the main and sub-tuners. Thus, the discrimination characters of the contents of picture, for example, the characters of the channels selected, are independently carried out on the main and sub-picture screens in response to the respective channel selection operations.

The assignee of the present application has previously proposed such a picture-in-picture television receiver in which each time the content of a picture displayed on the main picture screen is changed, the discrimination characters of the contents of pictures are made not only on the main picture screen but also on the sub-picture screen, respectively. This previously proposed picture-in-picture television receiver is disclosed in co-pending U.S. application Ser. No. 944,660, filed Dec. 19, 1986.

However, when the picture discrimination characters are respectively displayed on the main and sub-picture screens, the picture to be displayed on the sub-picture screen is formed such that sampling lines and picture elements of the sub-picture video signal are selected and other lines and picture elements are thrown away or removed in response to the ratio between the sizes of the main and sub-picture screens. As a result, the sub-picture discrimination character is very small on the sub-picture screen so that the discrimination character becomes difficult to see from the normal viewing distance of the user.

OBJECTS AND SUMMARY OF THE INVENTION

Accordingly, it is an object of this invention to provide an improved picture-in-picture television receiver.

It is another object of this invention to provide a picture-in-picture television receiver in which a sub-picture discrimination character indicated on a sub-picture screen becomes easy to see.

It is a further object of this invention to provide a picture-in-picture television receiver in which the compression ratio of the sub-picture discrimination character relative to the main picture discrimination character is selected to be smaller than that of the sub-picture screen relative to the main picture screen.

According to one aspect of the present invention, there is provided a picture-in-picture television receiver comprising:

(a) a picture display device having a picture screen which is divisible into a main picture screen and one or more sub picture screens inset into the main picture screen;

(b) a main picture circuit for selecting a first video signal from a plurality of video signals and supplying it as the main picture screen video signal;

(c) a sub-picture circuit for selecting a second video signal from a plurality of video signals and supplying the selected video signal as a sub-picture video signal for one or more of said sub-picture screens inset into the main picture screen of said picture display device;

(d) a composing circuit for composing the selected video signal for the main picture screen of said picture display device and the selected video signal for the sub-picture screen which is compressed and inset into a part of said main picture screen into a composite signal which is supplied to the picture display device;

(e) a first adder for adding a first picture discrimination character signal to said video signal for said main picture screen;

(f) a second adder for adding a second picture discrimination character signal to said video signal for said sub-picture screen; and (g) size control means for controlling the size of said second picture discrimination character as it is displayed on said sub-picture screen.

These and other objects, features and advantages of the present invention will become apparent from the following detailed description of the preferred embodiment that is to be read in conjunction with the accompanying drawings, throughout which like reference numerals designate like elements and parts.

DESCRIPTION OF THE PREFERRED EMBODIMENT

Now, an embodiment of a picture-in-picture television receiver according to the present invention will hereinafter be described in detail with reference to the attached drawings.

Initially, an overall arrangement of the embodiment of the television receiver according to the present invention will be described with reference to FIG. 1.

Figure 1:
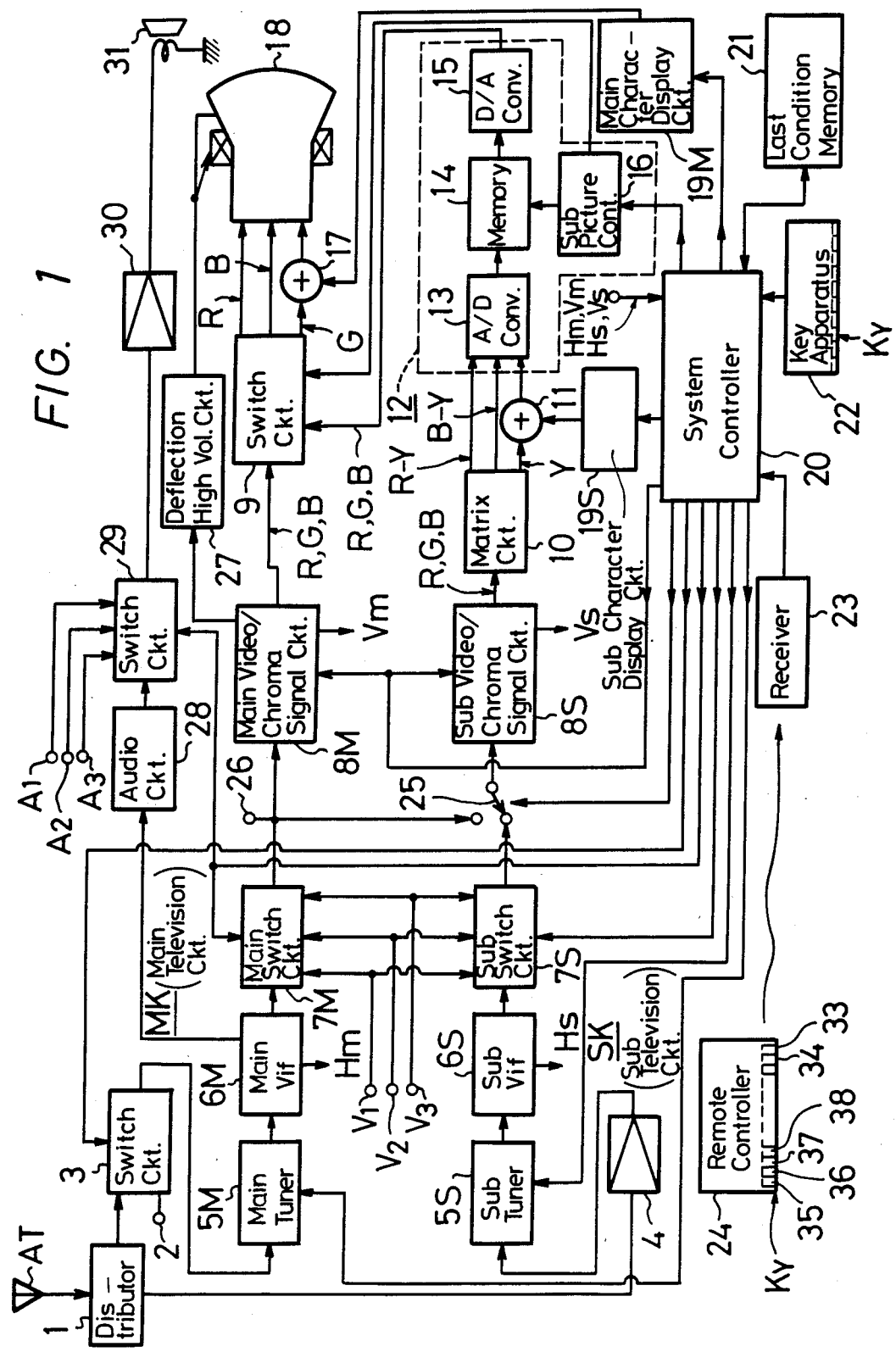
FIG. 1 is a block diagram showing an overall arrangement of an embodiment of a picture-in-picture television receiver according to the present invention.

Referring to FIG. 1, the television receiver of the invention includes a main television circuit MK and a sub-television circuit SK. A video signal supplied by the main television circuit MK causes a main picture to be displayed on the whole of a picture screen of a picture display device 18 such as a cathode ray tube (CRT) or the like, whereas a video signal supplied by the sub-television circuit SK causes a sub-picture to be displayed on a portion of the main picture screen in such a manner that the sub-picture is inset into the main picture. The main and sub-television circuits MK and SK include main and sub-tuners 5M and 5S, main and sub-video intermediate frequency circuits 6M, 6S and main and sub-video/chroma signal circuits 8M, 8S, respectively.

The television receiver is provided with external video signal input terminals V1, V2 and V3 to which reproduced video signals (base band signals) from a video tape recorder (VTR) or the like can be supplied. Selection of the video signals from the external input terminals V1, V2 and V3, in place of the video signals from the tuners 5M and 5S, can be effected by main and sub-switching circuits 7M and 7S provided in the television circuits MK and SK. The signal selected by the switching circuit is then supplied to the picture display device 18 to be displayed on its picture screen.

The sub-television circuit SK includes a video signal processor circuit 12 for displaying the sub-picture on the sub-picture screen of the picture display device 18. The video signal processor circuit 12 controls the kinds of sub-pictures (such as a live picture, a still picture, a step-by-step picture or the like), the number of sub-pictures, the position of the sub-picture on the main picture screen, and so forth. The expression "live picture" means that the displayed image is animated (moving) rather than static (still).

Figure 2A:
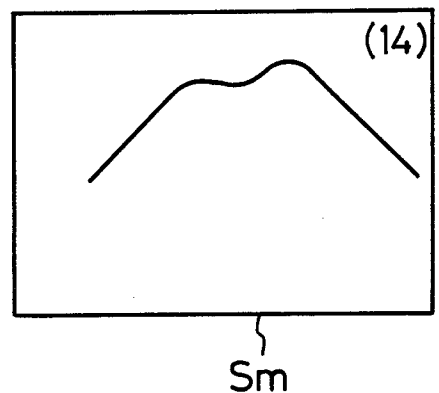
FIGS. 2A to 2C are respectively schematic representations used to explain the reproduction of a main picture and a sub-picture in the embodiment of the present invention.
Figure 2B:
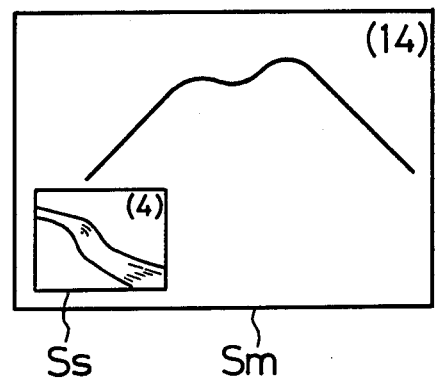

The main and sub-television circuits MK and SK are provided with respective main and sub-character display circuits 19M and 19S to display picture discriminating characters 14, 4, respectively, on the main picture screen and the sub-picture screen, respectively, in an inset fashion as shown in FIG. 2B. Each character #14, #4 may, for example, comprise the channel identification (for instance the channel number) of a received television broadcast or the number of an external video signal input terminal.

The television receiver includes a system control circuit or controller 20 which includes a microcomputer. Respective sections of the television receiver are controlled by the system control circuit 20 as will be explained in greater detail hereinafter.

The circuit arrangement of the above television receiver will now be described more fully. A television broadcast signal received by an aerial (antenna) AT is supplied to a distributor 1. The distributor 1 supplies the received signal through a switching circuit 3 to the main tuner 5M, without substantially attenuating the received signal, and also supplies a portion of the received signal to the sub-tuner 5S. In this case, the received signal portion is amplified by a high frequency amplifier 4 before it is applied to the sub-tuner 5S. Thus, the quality of the received signal at the main tuner 5M is kept and also the distribution loss for the sub-tuner 5S is compensated for. The switching circuit 3 selectively switches between the aerial input signal from the distributor 1, and a high frequency input signal from a descrambler used for receiving a cable television broadcast or the like which is supplied at an auxiliary input terminal 2, and supplies one of the signals to the main tuner 5M.

The video intermediate frequency signal from the main tuner 5M is supplied to the main video intermediate frequency circuit 6M and a video intermediate frequency signal from its video detecting circuit is supplied to the main switching circuit 7M which can be selectively switched between this video signal and the external video signals from the external video input terminals V1 to V3. One of the video signals selected by the switching circuit 7M is supplied to the main video/chroma signal circuit 8M. A monitor output terminal 26 is connected to the output side of the main switching circuit 7M. The main video/chroma signal circuit 8M generates red, green and blue color signals R, G and B which are then fed to a switching circuit 9.

An audio intermediate frequency signal from the main video intermediate frequency circuit 6M is supplied to an audio circuit (incorporating therein a sound multiplexing decoder circuit) 28. An audio signal from the audio circuit 28 is supplied to a switching circuit 29 which can be selectively switched between this audio signal and external audio signals reproduced from a VTR or the like and supplied thereto from external audio signal input terminals A1, A2 and A3, respectively corresponding to the external video signal input terminals V1, V2 and V3. One of the audio signals selected by the switching circuit 29 is supplied through a low frequency amplifier 30 to a loudspeaker 31.

In this case, though not shown, the low frequency amplifier and the loudspeaker are provided by two systems so as to cope with the stereophonic audio signal.

Horizontal and vertical synchronizing signals from the main video/chroma signal circuit 8M are supplied to a deflection/high voltage circuit 27. A deflection signal and a high dc voltage from the circuit 27 are supplied to the picture display device 1B.

The video intermediate frequency signal from the sub-tuner 5S is supplied to the sub-video intermediate frequency circuit 6S and a video intermediate frequency signal from its video detecting circuit is supplied to the sub-switching circuit 7S which selectively switches between this video signal and the external video signals from the external video signal input terminals V1, V2 and V3. A switch 25 effects selection between the video signal selected by the switching circuit 7S and the video signal from the main switching circuit 7M and supplies the chosen video signal to the sub-video/chroma signal circuit 8S. The sub-video/chroma signal circuit 8S generates red, green and blue color signals R, G and B which are supplied to a matrix circuit 10 in which they are converted to a luminance signal Y and red and blue color difference signals R - Y and B - Y, respectively, which are then fed to an analog-to-digital (A/D) converter 13 in the video signal processor circuit 12.

The A/D converter 13 is a time division type A/D converter as disclosed, for example, in published Japanese Patent Application Publication No. 60-44792. A digital signal from the A/D converter 13 is supplied to a memory 14 and written therein. The digital signal is read out from the memory 14 and then supplied to a digital-to-analog (D/A) converter 15 thereby to be converted to an analog signal.

In the video signal processor circuit 12, sampling lines and picture elements of the sub-video signal are selected and other lines and picture elements are thrown away or removed in correspondence with the ratio between the sizes of the main picture screen and the sub-picture screen, for example, 3:1, and then the selected lines are displaced on the sub-picture screen as a sub-picture in compressed state. The memory 14 has frame (or field) memory areas corresponding to the maximum number of displayable sub-pictures, for example, four frame memory areas. The memory 14 is controlled by a sub-picture control circuit 16 so as to specify the kinds of sub-pictures (such as a live picture, a still picture, a step-by-step picture and so on), the number of sub-pictures, the position of the sub-pictures on the main picture and the like.

When the sub-picture is displayed as a live picture, that is a real moving picture, the video signal is alternately written in and read out from the memory 14 continuously and repeatedly; when the sub-picture is displayed as a still picture, the video signal is written in the memory 14 for a selected frame or field period and then read out from the memory 14 repeatedly; and when the sub-picture is displayed as a step-by-step picture, a plurality of video signals are written in the memory 14 at different times corresponding to different frames or field periods and then read out therefrom repeatedly (see Japanese Patent Application Publication No. 56-27573). The number of the sub-picture screens inset into the main picture screen is determined on the basis of the number of memory areas in the memory 14 which are used. The contents or picture of the sub-picture screen can be a real moving picture, a still picture or a step-by-step picture based on the video signal from the sub-video/chroma signal circuit 8S or on the video signal from the main video/chroma signal circuit 8M. The switching of these video signals is carried out by the switch 25. The picture contents on the main picture screen and the sub-picture screen can be exchanged with each other by simultaneously switching the reception channels of the main and sub-tuners 5M and 5S or by simultaneously switching the main and sub-switching circuits 7M and 7S.

The respective color signals from the main/video chroma signal circuit 8M and the respective color signals from the D/A converter 15 are supplied to the switching circuit 9 in which both groups of respective color signals are switched at appropriate timing intervals such that the sub-picture screen is inset into one portion of the main picture screen at a selected predetermined position. The switching circuit 9 is controlled by the sub-picture control circuit 16, which is controlled by the system control circuit 20. The video signal from the switching circuit 9 is supplied to the picture display device 18.

The main picture discrimination indicating signal, such as a signal indicative of the main channel number, is formed by the main character display circuit 19M and is added to the video signal by an adder 17 connected between the switching circuit 9 and the picture display device 18. In this example, the adder 17 is interposed only in the transmission path of the green color signal G to thereby superimpose a green picture discrimination character upon the main picture screen. It is of course possible for this picture discrimination character to be made by using other colors.

The sub-picture discrimination character signal, which is formed by the sub-character display circuit 19S and which could be indicative of the channel number selected by the sub-tuner 5S, for example, is added to the sub-video signal by an adder 11 connected between the matrix circuit 10 and the A/D converter 13.

In this example, the adder 11 is interposed only in the transmission path of the luminance signal Y to thereby superimpose a white picture discrimination character on the sub-picture screen. However, it is possible for this picture discrimination character to be made by using other colors.

Channel selections by the main tuner 5M and the sub-tuner 5S are respectively carried out by channel selection signals from the system control circuit 20. The switching circuits, 3, 7M, 7S, 29 and the switch 25 are also selectively switched under the control of the system control circuit 20. The main and sub-video/chroma signal circuits 8M and 8S are subjected to blanking by the system control circuit 20 for a short period upon up and down scanning channel selection operation. Alternatively, such blanking may be carried out by a blanking switch that is provided at a stage before the picture display device 18. Further, main and sub-horizontal synchronizing signals Hm and Hs from the main and sub-video intermediate frequency circuits 6M and 6S and main and sub-vertical blanking signals (vertical signals) Vm and Vs from the main and sub-video/chroma signal circuits 8M and 8S are supplied to the system control circuit 20. The main picture and sub-picture discrimination indicating signal circuits 19M and 19S and the sub-picture control circuit 16 are controlled by the system control circuit 20.

A last-condition memory 21 stores, under the control of the system control circuit 20, the selected channels of the main and sub tuners 5M and 5S, the switch conditions of the switching circuits 7M and 7S, the control conditions of the sub-picture control circuit 16 and so on when power to the television receiver is turned off. When the television receiver is turned on again, the conditions of the respective circuits present when the television receiver was last turned off are reproduced under the control of the system control circuit 20.

A key apparatus 22 is connected to the system control circuit 20 and is provided with various kinds of keys KY to control the television receiver.

A remote controller (commander) 24 also is provided with various kinds of keys KY to control the television receiver. The remote controller 24 is also provided with a transmitter (not shown) to transmit a remote control signal based on the corresponding key operation. A receiver 23 for receiving the signal transmitted from the transmitter of the remote controller 24 is connected to the system control circuit 20. The remote control signal can be transmitted by means of a light beam, radio waves, sound wave and so on.

By way of example, the keys KY of the key apparatus 22 or the remote controller 24 may comprise: a power key 33; a recall key 34 (used to display the picture discrimination character such as the channel number); a mute key (used to mute the sound); ten keys (designated generally by the reference numeral 35) used to select the reception channel and the number of the external video signal input terminal; a TV (television)/VTR change-over key; an aerial input/auxiliary high frequency input change-over key; a sound multiplexing key; up and down keys 36 for incrementing and decrementing the contrast of luminance and chrominance signals, the main reception channels, the number of the main external video signal input terminal and the sound volume, respectively; an on-off key 37 for the sub-picture screen; up and down keys 38 for incrementing and decrementing the sub-reception channel and the number of the sub-external video signal input terminal; a still picture key; a step-by-step picture key; a shift key used to shift the position of the sub-picture screen; and a main-sub exchange key used to exchange the picture contents on the main picture and sub-picture screens.

Figure 2C:
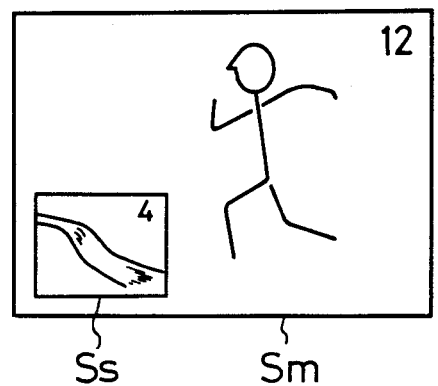

How to reproduce the main and sub-pictures according to the embodiment of the present invention will now be described with reference to FIGS. 2A to 2C.

The main picture is reproduced first. That is, when the mode switching key of the remote controller 24 is set to the TV mode and the channel selection operation key of the main tuner 5M is depressed, the channel number "#14", for example, is selected as the main channel number under the control of the system control circuit 20 and this channel number "#14" and the channel selection data are stored in the last-condition memory 21. Then, a picture of the channel number "#14" is displayed on a main picture screen Sm as shown in FIG. 2A and the channel number "#14" is displayed also on the main picture screen Sm for, for example, several seconds.

A sub-picture will be reproduced next. That is, when the sub-picture on and/or off key on the remote controller 24 is depressed, then a sub-picture screen is displayed.

When a picture based on a video signal from the sub-tuner 5S is reproduced on the sub-picture screen, a channel number "#4" is selected as the sub-channel number by depressing the up or down key of the sub-channel number on the remote controller 24. This channel number "#4" is stored in the last-condition memory 21 similar to the main channel.

Further, the display position of the sub-picture screen can be selectively shifted by the user. When the sub-picture screen position shift key on the remote controller 24 is depressed, the lower left-hand corner is selected from, for example, four corners of the main picture screen, whereby the picture of the channel number "#4" is displayed on the sub-picture screen Ss which is located at the lower left-hand corner of the main picture screen Sm as a sub-picture and the channel number "#4" is displayed thereon for several seconds as shown in FIG. 2B.

When a channel number "#12", for example, is selected as a main channel by depressing the channel selection operation key, for example, the down key of the main tuner 5M on the remote controller 24 under the reception state shown in FIG. 2B, then the picture displayed on the main picture screen Sm is changed into a picture of the channel number "#12" and the main channel number "#12" and the sub-channel number "#4" are respectively displayed on the main picture screen Sm and the sub-picture screen Ss.

When a picture based on the external video signal is displayed on either or both of the main and sub-picture screens Sm and Ss, if the picture content of the main picture screen Sm is changed, picture discriminating characters are displayed on the main picture screen Sm and sub-picture screen Ss in each case.

Figure 3:
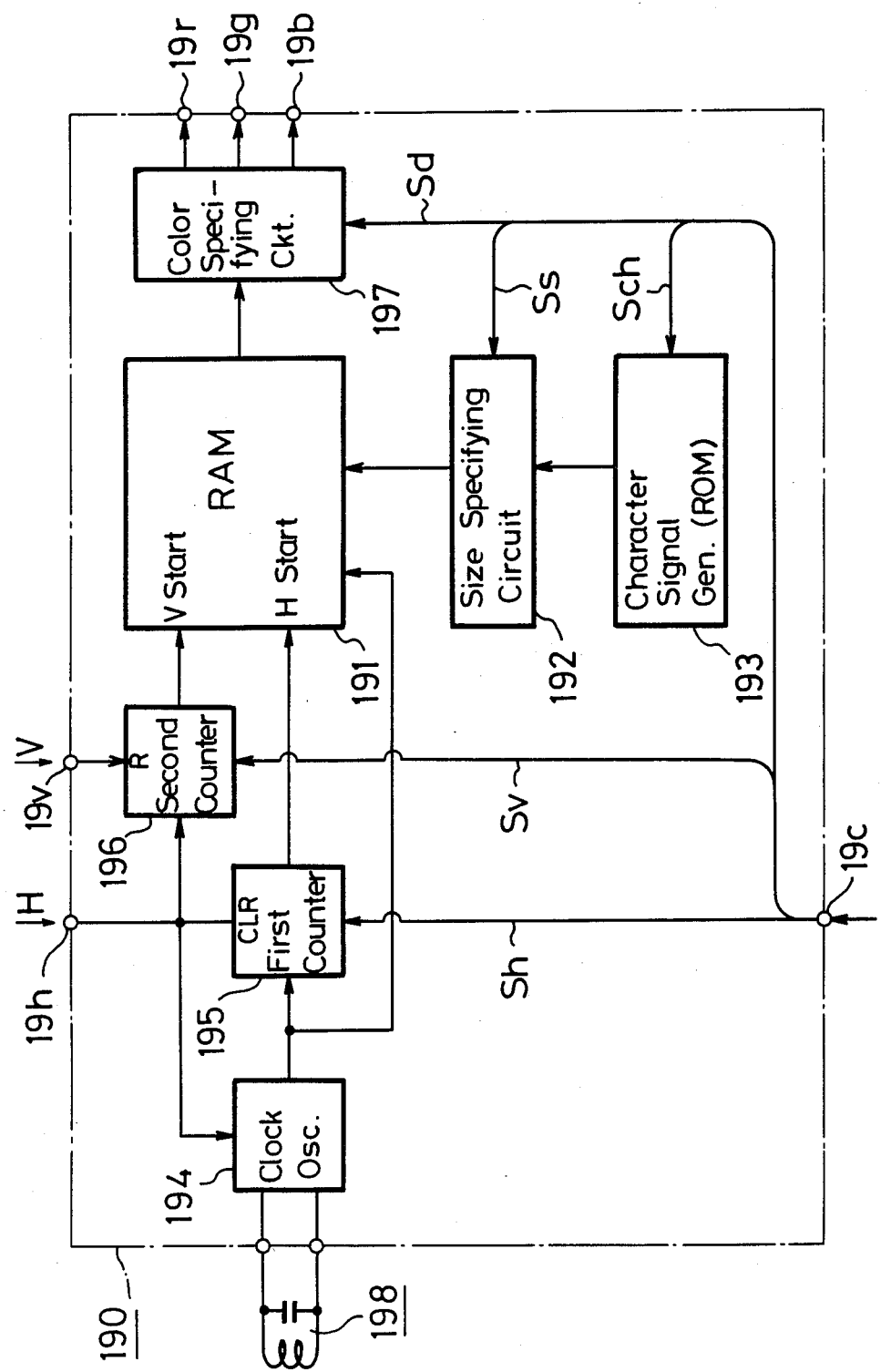
FIG. 3 is a block diagram showing a main portion of the embodiment of the picture-in-picture television receiver according to the present invention.

How to display the picture discriminating character according to the embodiment of the present invention will now be described with reference to FIG. 3 and FIGS. 4A to 4C. FIG. 3 is a block diagram showing the construction of a main portion of the embodiment of the present invention.

Referring to FIG. 3, there is shown a character display circuit 190 which generally represents both of the aforementioned main and sub character display circuits 19M and 19S.

In the character display circuit 190, a RAM (random access memory) 191 is provided which receives an output of a ROM (read only memory) 193 used as a character signal generator through a size specifying circuit 192. An output from a clock oscillator 194 is supplied to the RAM 191 and a first counter 195. A horizontal synchronizing signal H applied to a terminal 19h is supplied to the clock oscillator 194 and the first counter 195 as a synchronizing signal and a clear control signal and to a second counter 196. The second counter 196 receives from a terminal 19v a vertical synchronizing signal V as a reset control signal. Both the counters 195 and 196 respectively receive from a terminal 19c connected to the system control circuit 20 (see FIG. 1) a horizontal position specifying signal Sh and a vertical position specifying signal Sv, whereby the number of clocks to be counted and the number of horizontal synchronizing signals to be counted are specified, respectively. The outputs of both the counters 195 and 196 are supplied to the RAM 191 as horizontal and vertical read starting signals so that the character signal is read out from the RAM 191 at timings corresponding to the specified positions on the picture screens.

The character signal delivered from the RAM 191 is supplied through a color specifying circuit 197 to output terminals 19r, 19g and 19b. This color specifying circuit 197 is supplied with a color specifying signal Scl from the terminal 19c while the size specifying circuit 192 and the ROM 193 are respectively supplied with a size specifying signal Ss and a character specifying signal Sch from the terminal 19c, whereby a predetermined character (or figure) is displayed on the picture screen in a predetermined size and in a predetermined color. If the main picture discriminating character and the sub-picture discriminating character are displayed in other colors than green and white colors respectively, the connections of the adders 11 and 17 (FIG. 1) will be changed properly.

An LC resonance circuit 198 is connected to the clock oscillator 194 and thereby its clock frequency $f_{CK}$ is selected to be about 5 MHz. The clock frequency $f_{CK}$ is scattered in a range of about ±5% due to the scattering of the L (reactance) or C (capacitance) forming the resonanc circuit 198.

In the case of the main character display circuit 19M, the display position of the discriminating character is displaced by the displaced amount of substantially one character due to the displacement of the clock frequency $f_{CK}$ by 5%. In addition, since the degrees of various adjustments concerning the video image and the audio sound such as brightness, contrast, chromaticity, hue, sound volume, sound quality and so on are displayed on the main picture screen Sm in the form of a bar chart, the tolerance of the display position displacement is decreased and hence, the frequency of the resonance circuit 198 must be adjusted in the manufacturing process of the television receiver.

In this embodiment, the picture discriminating characters displayed on the sub-picture screen Ss may be two kinds of characters, for example, the channel number and the external video signal input terminal number. The maximum number of characters that can be displayed is 7 letters containing a blank portion, e.g. "VIDEO 2".

Figure 4A:
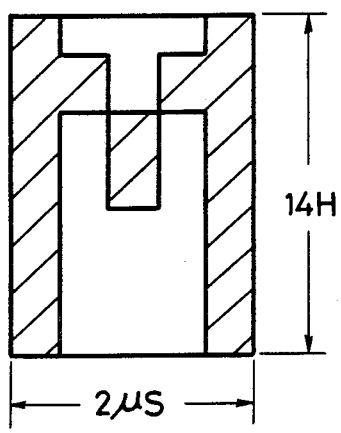
FIGS. 4A to 4C are respectively schematic representations used to explain the operation of the main portion of the invention shown in FIG. 3.
Figure 4B:
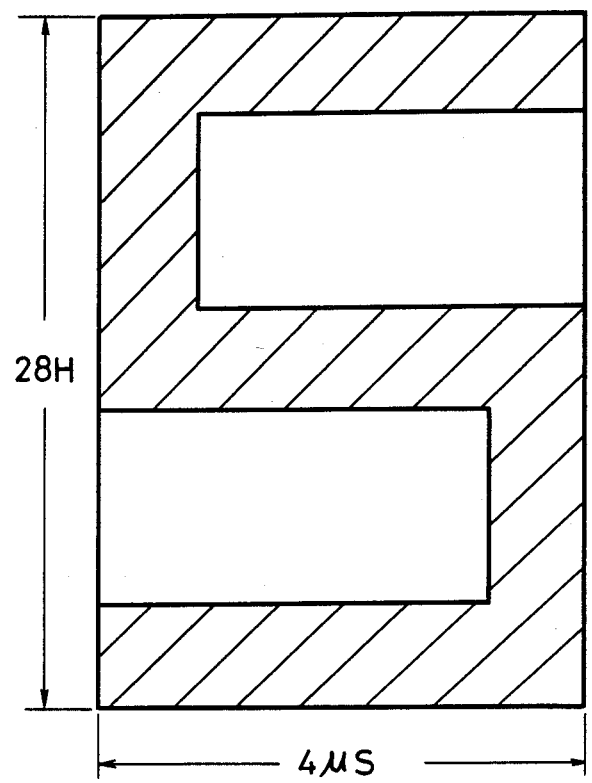

For this reason, according to the present invention, the size of the picture discriminating character displayed on the main picture is selected to be 2-microseconds in length in the horizontal direction and 14H in length (corresponding to 14 scanning lines during one field) in the vertical direction as, for example, shown in FIG. 4A. The size of a picture discriminating character displayed on the sub-picture screen is selected to be 4-microseconds length in the horizontal direction and 28H in length in the vertical direction which size is just twice the size of the character displayed on the main picture screen as, for example, shown in FIG. 4B so as to display 7 letters on substantially the whole of the effective width of the sub-picture screen of, for example, 40-microseconds in length.

Figure 4C:
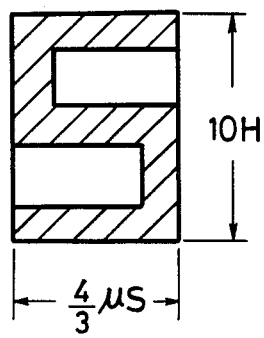

As earlier noted, the sampling lines and picture elements of the sub-picture screen video signal and discriminating character signal are selected and other lines and picture elements are thrown away or removed in correspondence with the ratio between the sizes of the main and sub-picture screens, for example, 3:1 by the video signal processor circuit 12 with the result that the sub-picture discriminating character is compressed in size, for example, 4/3-microseconds in length in the horizontal direction and 10H in length in the vertical direction as shown in FIG. 4C, which then is displayed on the sub-picture screen. Since the compression ratio (2:3) of this sub-picture screen discriminating character relative to the main picture discriminating character is twice the compression ratio (1:3) of the sub-picture screen relative to the main picture screen, the sub-picture discriminating character becomes easy to see.

In this case, since the displacement of the display position of the sub-picture discriminating character due to the 5% displacement of the clock frequency $f_{CK}$ is reduced to one half of the character and the accuracy of the display position is increased relatively, the adjustment of the clock frequency becomes unnecessary and the manufacturing cost can be decreased.

Alternatively, the size of the sub-picture discriminating character is selected to be equal to that of the main picture discriminating character, the sub-picture discriminating character signal and the sub-picture signal are compressed with different compression ratios by the respective video signal processing circuits and then both of them are added to each other.

According to the present invention, as set forth above, since the compression ratio of the sub-picture screen discriminating character relative to the main picture discriminating character is selected to be larger than that of the sub-picture screen relative to the main picture screen, the sub-picture discriminating character can be displayed relatively large in the easier-to-see form. At the same time, the adjusting process of the clock frequency in the sub-character signal generating circuit can be omitted so that the manufacturing cost of the picture-in-picture television receiver of the invention can be reduced.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

I claim as my invention:

1. A television receiver comprising:
   (a) a video picture display device having a picture screen which is divisible into a main picture screen for displaying a picture represented by a first video signal and one or more sub-picture screens inset into the main picture screen for displaying a compressed picture represented by a second video signal;
   (b) a main picture circuit for selecting the first video signal from a plurality of video signals supplied by external sources and supplying the selected first video signal as the main picture screen video signal;
   (c) a sub-picture circuit for selecting the second video signal from a plurality of video signals supplied by external sources and supplying the selected second video signal as a sub-picture video signal for one or more of said sub-picture screens;
   (d) a composing circuit for composing the first and second video signals into a composite signal which is supplied to the picture display device;
   (e) a first adder for adding a first picture discrimination character signal to said first video signal, whereby a first picture discrimination character is displayed as part of the picture on the main picture screen;
   (f) a second adder for adding a second picture discrimination character signal to said second video signal, whereby a second picture discrimination character is displayed as part of the picture on the sub-picture screen; and
   (g) size control means for controlling the size of said second picture discrimination character as it is displayed on said sub-picture screen.

2. A television receiver according to claim 1, in which said size control means produces a compression ratio of said second picture discrimination character relative to said first picture discrimination character which ratio is smaller than the compression ratio of the picture displayed on the main picture screen relative to the picture displayed on the sub-picture screen.

3. A television receiver according to claim 2, in which a compression ratio of said second picture discrimination character relative to said first picture discrimination character is selected to be substantially ½ the compression ratio of said second video signal picture relative to said first video signal picture.

4. A television receiver according to claim 1, in which said size control means causes the size of said first picture discrimination character to be smaller than the size of said second picture discrimination character prior to their display on the respective screens.

5. A television receiver according to claim 4, in which the ratio of the size of said second picture discrimination character relative to said first picture discrimination character is selected to be smaller than the ratio of the size of said first video signal picture relative to the size of said second video signal picture.

6. A television receiver according to claim 1, in which said size control means causes the ratio of the size of the displayed second picture discrimination character relative to the size of the displayed first picture discrimination character to be larger than the ratio of the size of the picture displayed on the subpicture screen relative to the size of the picture displayed on the main picture screen.

* * * * *